United States Patent [19]

Sato et al.

[11] 4,111,578
[45] * Sep. 5, 1978

[54] FITTINGS FOR CONNECTING COLUMNS AND BEAMS OF STEEL FRAME CONSTRUCTION

[75] Inventors: Kuniaki Sato, Hiratsuka; Yoshihiro Nakamura, Kamakura; Hideaki Ninomiya, Tokyo, all of Japan

[73] Assignees: Kajima Corporation; Hitachi Metals, Ltd., both of Tokyo, Japan

[*] Notice: The portion of the term of this patent subsequent to Sep. 5, 1995, has been disclaimed.

[21] Appl. No.: 547,775

[22] Filed: Feb. 7, 1975

[51] Int. Cl.² .......................................... F27D 19/00;
[52] U.S. Cl. .................................. 403/189; 403/262; 52/283
[58] Field of Search ............... 52/283, 665, 758 B; 403/232, 262, 187, 189, 169–178

[56] References Cited

U.S. PATENT DOCUMENTS

| | | | |
|---|---|---|---|
| 798,738 | 9/1905 | Lundstedt | 403/262 |
| 1,185,207 | 5/1916 | Lally | 52/283 |
| 3,438,663 | 4/1969 | Colson | 52/758 |
| 3,513,610 | 5/1970 | Devonport | 52/283 |
| 3,591,214 | 7/1971 | Gallay | 52/665 |
| 3,593,477 | 7/1971 | Briggs | 52/283 |
| 3,938,297 | 2/1976 | Sato et al. | 52/760 |

*Primary Examiner*—Andrew V. Kundrat

[57] ABSTRACT

Fittings for connecting columns and beams of a steel frame construction, each comprising a substantially rectangular base plate to be connected to the column by means of high strength bolts and having centrally a horizontally continuous thicker portion from which the base plate is tapered toward upper and lower edges, a horizontal protrusion projecting from the thicker portion in opposition to a flange of the beam and vertical protrusion in opposition to a web of the beam and projecting from the base plate to form with the horizontal protrusion a T-shaped protrusion.

3 Claims, 22 Drawing Figures

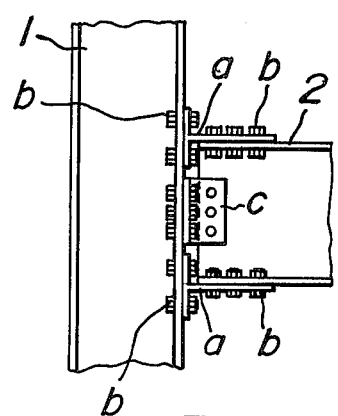
FIG._1
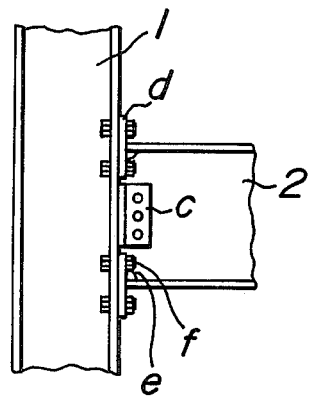
FIG._2
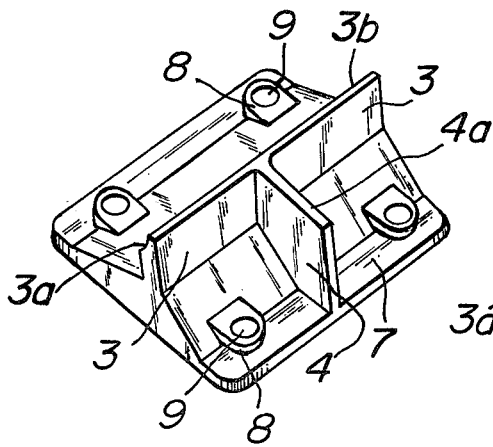
FIG._3a
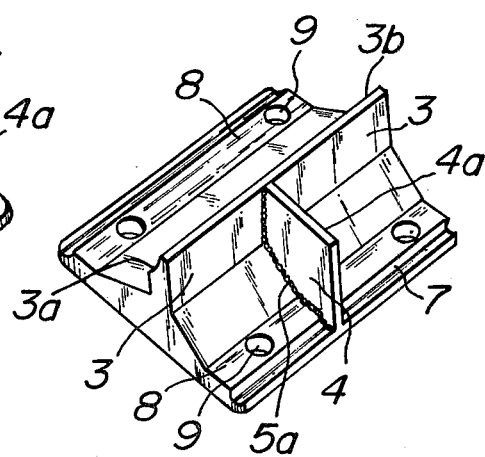
FIG._3b
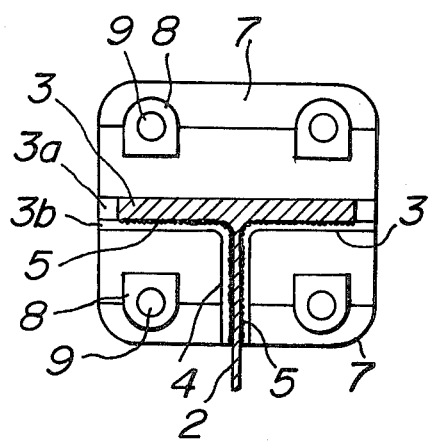
FIG._4
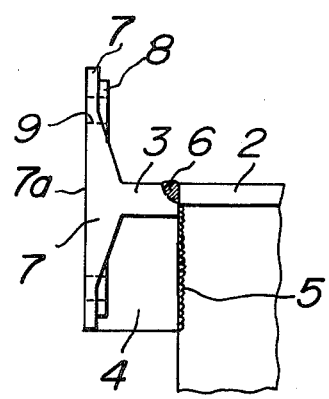
FIG._5

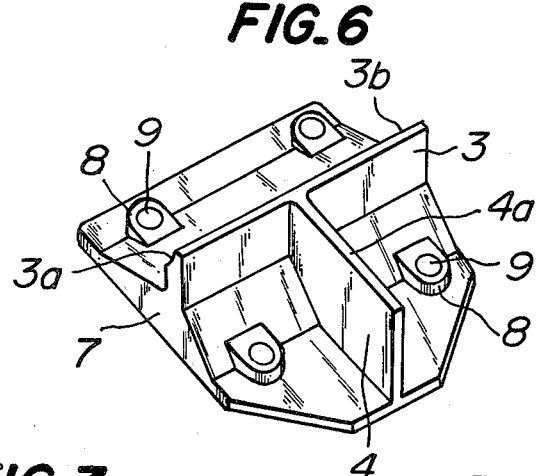
FIG_6
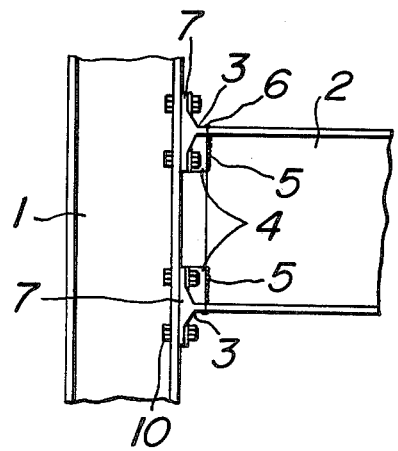
FIG_7
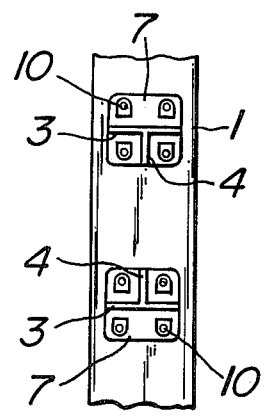
FIG_8
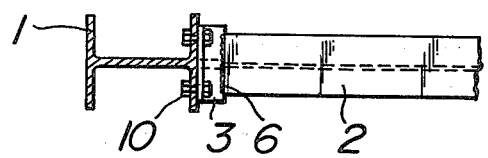
FIG_9

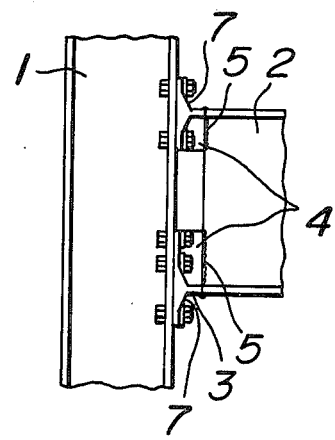
FIG_10
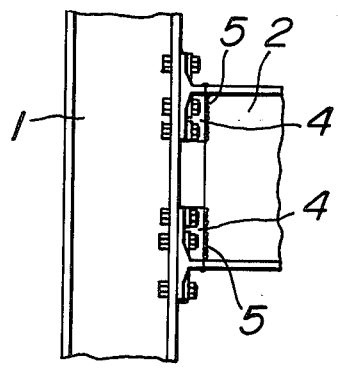
FIG_11
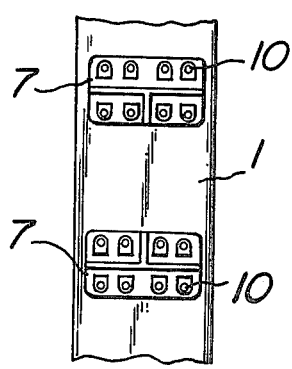
FIG_12
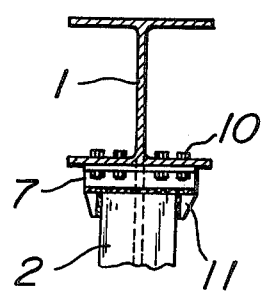
FIG_13
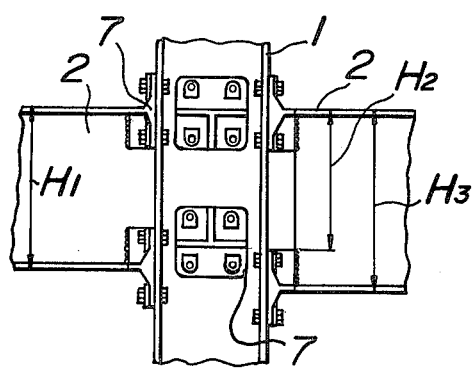
FIG_14
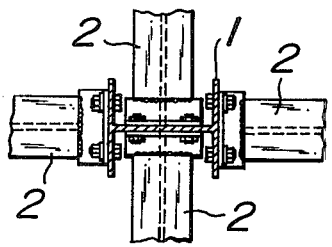
FIG_15

FIG.16
FIG.19
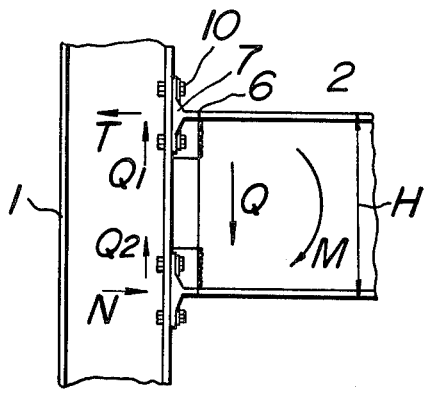
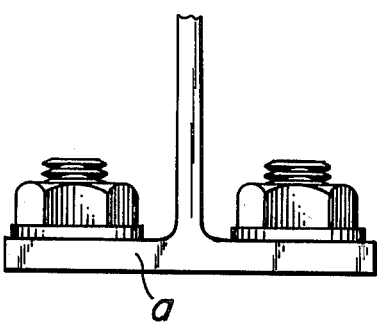
FIG.17
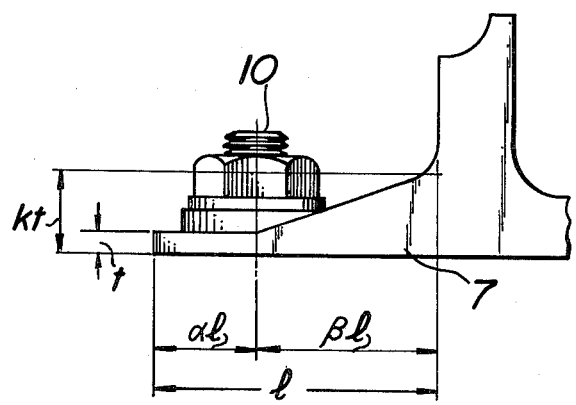
FIG.18
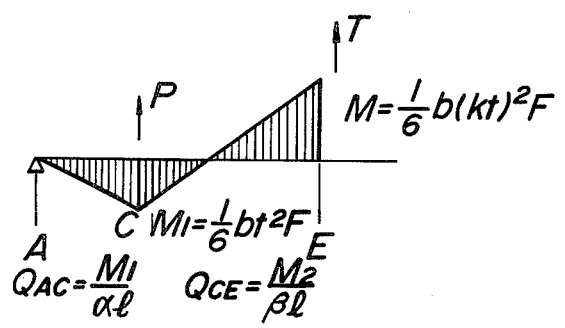

4,111,578

FITTINGS FOR CONNECTING COLUMNS AND BEAMS OF STEEL FRAME CONSTRUCTION

BACKGROUND OF THE INVENTION

1. Field of the Invention

The invention relates to fittings for connecting columns and beams of a steel frame construction, and more particularly a method of connecting the columns and beams of a steel frame construction.

2. Description of the Prior Art

In prior art steel frame construction, T-shaped members each of which may be obtained by cutting H-shaped steel have often been used for connecting columns and beams. However, such T-shaped members are insufficient to transmit a shearing force acting on the beam to the column, so that a web of the beam must generally be connected to a flange of the column by means of separate joint members which would make the construction method complicated and expensive.

In another prior art steel frame construction, welding members of steel plate are welded to the flanges of the beam for connecting the column to the beam. In that case, however, the beam must be provided at corners between its flanges and web with notches required for welding operation. Accordingly, after the plate members have been connected to the web of the beam by means of a fillet weld joint, the notches adversely affect a transmission of a shearing force acting upon the beam to the column so that separate joint members are also required for the construction which would make it complicated and expensive.

In the prior art in this manner, connections of columns and beams in steel frame construction generally required extra joint members and need complicated working and assemblies of the members and further have only low joint efficiencies.

SUMMARY OF THE INVENTION

In order to overcome the above disadvantages in the prior art the fittings according to the invention each comprising a substantially rectangular base plate to be connected to said column having centrally a horizontally continuous thicker portion from which the base plate is tapered, a horizontal protrusion projecting from said thicker portion in opposition to a flange of said beam, a vertical protrusion in opposition to a web of said beam and projecting from said base plate to form with said horizontal protrusion a T-shaped protrusion and seats formed with holes for bolts.

In another aspect the invention provides a method of connecting a column and a beam having an H-shaped section of a steel frame construction, comprising steps of providing a fitting comprising a protrusion in opposition to a flange and a web continual thereto of said beam, a base plate tapered from a bottom of the protrusion in opposition to the flange of said beam toward upper and lower portion of the base plate and seats having holes for bolts formed in said base plate, and connecting said fitting to said column with said bolts and the said beam with said protrusions by welding.

An object of the invention is to provide improved fittings for connecting columns and beams of a steel frame construction capable of simplifying manufacture of steel frame members in a factory, transportation of the members and execution of works in building site to save the labor and to increase its efficiency and having a higher joint efficiency than that of the prior art using T-shaped members or steel plates for welding to ensure an improved safety of the construction and to provide a wide range of the application.

Another object of the invention is to provide an improved method of connecting columns and beams of a steel frame construction capable of saving labor and increasing the joint efficiency to ensure an improved safety of the construction and to provide a wide range of the application.

BRIEF DESCRIPTION OF THE DRAWINGS

FIG. 1 is a side elevation of a connection of a column and a beam of a steel frame construction using T-shaped members in the prior art;

FIG. 2 is a side elevation of a connection of a steel frame construction using welding plates in the prior art;

FIG. 3a is a perspective view of a fitting according to the invention;

FIG. 3b is a perspective view of a fitting of other embodiment of the invention;

FIG. 4 is a front elevation of the fitting according to the invention showing a flange and a web of a beam welded thereto in shaded lines;

FIG. 5 is a side view of the fitting and the beam shown in FIG. 4;

FIG. 6 is a perspective view of a fitting of a preferred embodiment of the invention;

FIG. 7 is a front elevation of a connection of a column and a beam using the fitting according to the invention;

FIG. 8 is a side view of the connection shown in FIG. 7;

FIG. 9 is a plan view of the connection shown in FIG. 7;

FIG. 10 is a front elevation of a connection of a column and a beam using the upper fitting as shown in FIG. 3i a and the lower fitting as shown in FIG. 6;

FIG. 11 is a front elevation of a connection of a column and a beam using the fittings shown in FIG. 6;

FIG. 12 is a side view showing fittings having elongated base plate in a horizontal direction fixed to a column according to the invention;

FIG. 13 is a plan view of the fitting and the column and a beam as shown in FIG. 12;

FIG. 14 is a front elevation showing a connection of a column and beams having different heights using the fittings according to the invention;

FIG. 15 is a plan view of the connection shown in FIG. 14;

FIG. 16 is an explanatory view showing a stress and moment acting upon one end of a beam and reactions produced in a column corresponding thereto;

FIG. 17 is an explanatory sectional view for calculation of the yield strength of the fittings according to the invention;

FIG. 18 is a bending moment diagram in a base plate of the fitting subjected to a tensile force;

FIG. 19 shows a T-shaped member in the prior art;

DESCRIPTION OF THE PREFERRED EMBODIMENTS

Figure 20:
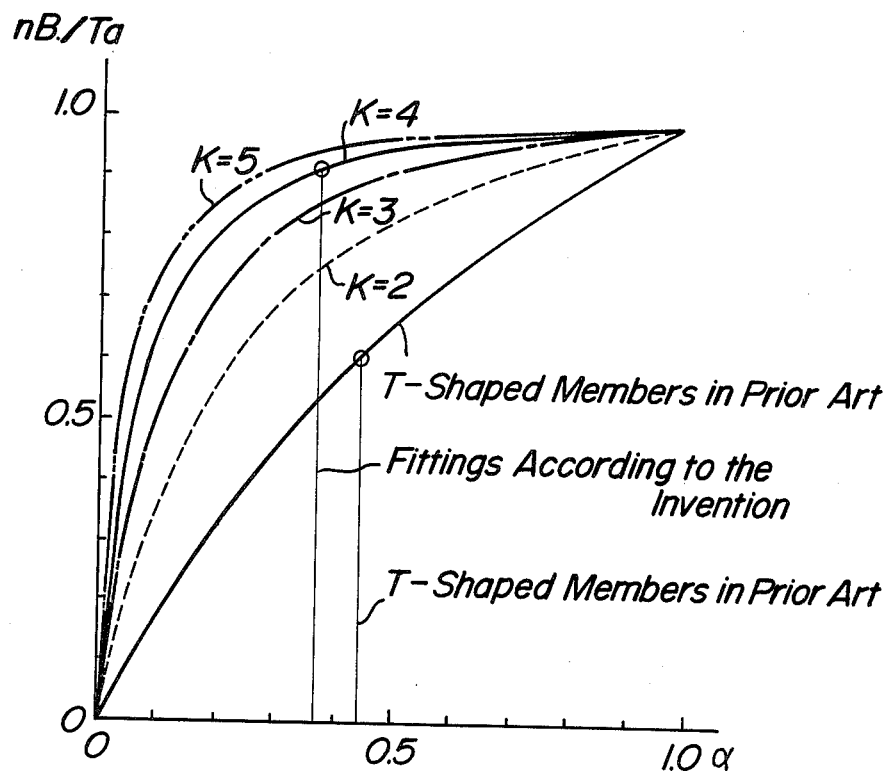
FIG. 20 is a diagram showing relations between joint efficiencies and positions of bolts in comparison of the fittings according to the invention with those in the prior art.

Referring to FIGS. 1 and 2, there is shown connections of columns 1 and beams 2 hitherto used. The connection shown in FIG. 1 utilizes T-shaped members *a* each of which may be obtained by cutting H-shaped steel or by welding steel plates.

The flanges of the beam 2 are fixed to the flange of the column 1 through the T-shaped members *a* connected to the flanges of the beam and the column by means of high strength bolts *b*. The T-shaped members are insufficient to transmit a shearing force acting upon the beam 2 to the column 1, so that a web of the beam 2 must generally be connected to the flange of the column by means of separate joint members *c* (FIG. 1).

Referring to FIG. 2, welding members *d* of steel plates are welded to the flanges of the beam 2. In the case, the beam must be provided with notches *e* at corners between the flanges and the web required for the welding operation. Accordingly, after the plate members *d* have been connected to the web of the beam 2 by means of a filled weld joint *f*, the notches *e* render it insufficient to transmit a shearing force acting upon the beam 2 to the column 1 so that joint members *c* are also required for the construction.

It can be seen from the above description that the connections of columns and beams hitherto used in steel frame constructions require many joint members, and need complicated working and assemblies of the members, and further have only low joint efficiencies.

The invention intends to eliminate these disadvantages in the prior art and provide a steel frame construction having a high joint efficiency.

Referring to FIG. 3a showing a preferred embodiment of the invention, a metal fitting is provided with a horizontal protrusion 3 adapted to be in opposition to the flange of the beam 2, which is formed along its one edge with a beveling 3a for butt welding. The fitting is further provided with a vertical protrusion 4 forming with the protrusion 3 a T-shaped protrusion, the upper surface 4a of which has a width sufficient to be in contact with the web of the beam 2 for fillet welding and is in flush with the upper surface 3b of the horizontal protrusion 3 which serves as a backing for the butt welding. Prior to the butt welding of the flange, the fillet welding portions 5 extend as shown in FIGS. 4 and 5 which may prevent a weld drip of the butt welding 6 (FIG. 5). A base plate 7 is tapered toward its opposite ends or upper and lower ends, of which gradient affects on the joint efficiency so that it should be determined depending upon a shape of the base plate and a yield strength and arrangement of the bolts which will be explained later. The plate 7 is formed with seats 8 each having a through hole 9 to provide surfaces in close contact with the bolts or washers.

A surface 7a of the fitting which is adapted to be in contact with the flange of the column is generally flat mating with the surface of the flange. However, the surface 7a may be any configuration matching a surface of the flange, if it is uneven or curved.

FIG. 3b illustrates other embodiment of the fitting according to the invention wherein a main body is obtained by cutting an elongated rolled shape steel having a desired sectional shape of a base plate or extruded from any suitable extruder and is provided with a plate-like member or vertical protrusion 4 welded thereto by means of welds 5a. Seats 8 are preferably continuous in a rolled or extruded direction.

A fitting shown in FIG. 6 has an elongated contact area 4a of a vertical protrusion 4, which is adapted to be in contact with a web of a beam.

The fittings according to the invention have the configuration above described which is made as a unitary body by casting or drop-forging or a combination of rolling and welding or extruding and welding.

Referring to FIGS. 7-9 showing a typical construction using the fittings according to the invention, the protrusions 3, 4 of the fittings are welded to the upper and lower flanges and the web to connect them to the beam 2 and the base plates 7 are fixed to the flange of the column 1 by means of high strength bolts 10.

In other embodiment shown in FIG. 10, the fitting shown in FIG. 6 is used as a lower fitting for the purpose of increasing a shearing strength to resist to a relatively large shearing force acting upon the beam 2.

In another embodiment shown in FIG. 11, the fittings shown in FIG. 6 are used as upper and lower fittings in order to resist a greater shearing force acting upon the beam 2.

Referring to FIGS. 12 and 13, a base plate 7 of the fitting is elongated in a horizontal direction to increase the number of the high strength bolts 10 so that the yield strength of the fittings increased to resist to a great bending moment acting upon the beam 2. As shown in FIG. 13, supplementary fittings 11 may be used for transmitting the stress of the beam, if the width of the flange of the beam is less than that of the fitting.

In other embodiment shown in FIGS. 14 and 15, by the use of the fittings according to the invention, to flanges and webs of a column 1 having a H-shaped sectional area are jointed beams 2 having flanges and webs different in size from those of the column 1.

A stress transmission mechanism at connections between a column and a beam using the fittings according to the invention will be explained in detail referring to FIGS. 16-21.

The end of the beam 2 is generally subjected to a bending moment M and a shearing force Q simultaneously as shown in FIG. 16. These actions result in a tensile force T and a compressive force N at the proximities of the upper and lower fittings in the column 1. The relation between the absolute values of these forces and the height H of the web of the beam 2 will be illustrated in the following formula.

$$|T| = |N| = M/H$$

On the other hand, reactions to the shearing force Q are $Q_1$ in the upper fitting and $Q_2$ in the lower fitting and the shearing force Q equals $Q_1$ plus $Q_2$ ($Q = Q_1 + Q_2$). The tensile force T in the upper flange becomes larger, the reaction $Q_1$ becomes smaller correspondingly thereto, and it will be zero at the limit where the high strength bolts are about to separate from the flange of the column. In the joining system, as the base plate of the fitting and the flange of the column bear against each other by clamping forces required to tighten the high strength bolts 10, a resulting frictional force between the fitting and the flange of the column will serve to support a shearing force acting in a direction perpendicular to the bearing surfaces. The resisting force $Q_0$ supporting the shearing force is depending upon the tensile force $T_0$ in the bolts resulting from the clamping force and a friction factor or coefficient $\mu$. If all the bolts of the fitting are uniformly clamped, a relation between $Q_0$, $T_0$ and $\mu$ is indicated by $2T_0\mu = Q_0$.

Accordingly, if the external force Q is less than the resisting force $Q_0$ ($Q < Q_0$), the fitting exhibits a sufficient resistance to the shearing force. If the external force Q is equal to or more than the resisting force $Q_0$ ($Q \geq Q_0$), the tensile force $T_0$ in the bolts must be increased or the fittings as shown in FIG. 6 are required as in FIGS. 10 and 11. The shearing force is of course transmitted to the upper and lower fittings through the welts 5 connecting between the fittings and the web of the beam.

Considering the tensile force T or compressive force N in the fitting, the compressive force never gives rise to any problem as to the faculty of the fitting, but the tensile force is transmitted for example through the welt 6 from the flange of the beam 2 to the base plate 7 of the fitting so that it acts on the bolts 10 as a tensile stress to cause them to separate from the flange even if the bolts are previously clamped enough. If the bending moment at that time is assumed as a critical yield strength of the connection, the strength depends upon the configuration of the fitting and the yield strength of the bolts. According to the invention, the fitting is made by casting or drop-forging or a combination of rolling and welding or extruding and welding to increase its yield strength in the most effective manner to achieve a high joint efficiency.

The connection of steel frames using the fittings according to the invention will be compared with those using T-shaped members or welding plates in the prior art.

In the joint system in the prior art as shown in FIGS. 1 and 2, a bending moment M is transmitted to the column as the reactions T and N as shown in FIG. 16, which is substantially the same as in the fitting according to the invention, however, the shearing force is transmitted in a manner different from that of the fitting according to the invention. In comparison of the yield strength under tensile forces of the fitting according to the invention and the T-shaped member in FIG. 1 or the welding plate in FIG. 2 in the prior art, the effects of the invention will be theoretically proved hereinafter.

FIG. 17 shows a diagrammatical section of the fitting according to the invention, wherein the letters in the drawing indicate respective dimensions. FIG. 18 illustrates a stress diagram of the fitting shown in FIG. 17 subjected to a tensile force T. FIG. 19 illustrates a diagrammatical section of the T-shaped member or the welding plate in the prior art.

Assuming that a tensile force acting upon the bolts 10 at the moment the base plate of the fitting is about to separate from the flange of the column is a critical yield strength, it has been experimentally found that the critical strength is coincident with the yield strength of the bolts.

It will be assumed that the base plate of the fitting is separated from the flange of the column at the moment a deformation of the base plate reaches its elastic limit, that is, an ideal case that the bending yield strengths of the base plate 7 and the bolts appropriately harmonize with each other.

Equations indicating this condition are as follows. A shearing force $Q_{AC}$ acting on between A and C and a shearing force $Q_{CE}$ on between C an E in FIG. 18 are $$Q_{AC} = bt^2F/6\alpha l \qquad (1)$$

$$Q_{CE} = [bt^2(1+K^2)F]/6\beta l \qquad (2)$$

where b is the width of the base plate and F is the yield stress of the base plate.

As the tensile force T acts on one side of the base plate, it equals to $Q_{CE}$.

$$T = Q_{CE} \qquad (3)$$

The tensile force P acting upon the bolts on the one side of the base plate is indicated by the following equations (4) and (5) using the number n of the bolts arranged on one side of the base plate and the yield strength or force $\beta Ty$ of the one bolt.

$$P = Q_{AC} + Q_{CE} \qquad (4)$$

$$P = n\beta Ty \qquad (5)$$

Substituting the equation (4), (1) and (2) in the equation (5) gives a relation between the yield force of the bolts, the dimensions of the base plate and the yield stress F of the base plate.

$$\frac{bt^2F}{6l}\left(\frac{1+\alpha k^2}{\alpha\beta}\right) = n\beta Ty \qquad (6)$$

An allowable tensile force $Ta$ of the fitting is expressed as the equation (7) using (3).

$$2\,Ta = 2\,Q_{CE} \qquad (7)$$

Upon using an allowable bending stress F/1.3 instead of F and an allowable tensile force $\beta Ta$ instead of $\beta Ty$, eliminating $bt^2F/6l$ from the equations (2) and (6) and substituting it into the equation (7), it follows that $$2\,Ta = \frac{2\alpha(1+k^2)}{1+\alpha k^2}\,n\,\beta Ta \qquad (8)$$

where k indicates the gradient of the surface of the base plate and $\alpha$ is depending on the position of the bolts relative to the width l of the base plate as shown in FIG. 17.

If the joint efficiency is defined as a ratio of the total allowable tensile force of the bolts to the allowable tensile force of the fitting, it is evident that such a fitting of which joint efficiency is near 100% is superior.

FIG. 20 is a diagram showing a comparison of the fitting according to the invention with the T-shaped member hitherto used. In the diagram, the curves are plotted with variation in the value k with the ordinate indicating the joint efficiency and the abcissa indicating the position of the bolts relative to the length l of one side of the fitting (FIG. 17).

The T-shaped members are generally made of H-shaped steel and the position of the holes for bolts is in accord with the standard of steel frame design decided by The Architectural Institute of Japan, so that the value $\alpha$ is substantially constant, 0.44. The thickness of a base plate of the T-shaped member is constant, resulting in $k = 1.0$. The joint efficiency 0.6 is obtained from the diagram using these values. It means that the yield strength of the T-shaped member intended in its design is only 60% of the total allowable force of the bolts, which percent value has been ascertained experimentally. Using a thicker base plate for the T-shaped member is only one way in order to increase the joint efficiency.

In contrast herewith, according to the invention, the value $k$ determining the position of the bolts can be large owing to the fact that any configuration of the fitting can be selected in casting, drop-forging or a combination of rolling and welding or extruding and welding. As a result, the joint efficiency of the fitting according to the invention will higher than that of the T-shaped member in the prior art by about 50%.

Figure 21:
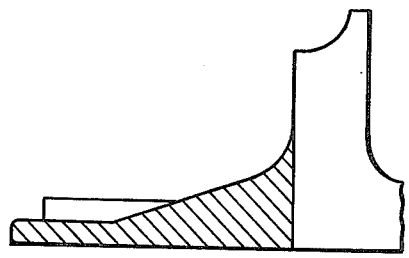
FIG. 21 is a partly sectional fragmentary schematic view of the fitting according to the invention.

In order to compare required steel material of the fitting with the T-shaped member, Table 1 indicates sectional areas of these member required to obtain the same yield strength as shown in shaded area in FIG. 21.

Table 1

| | | | | | |
|---|---|---|---|---|---|
| ($F=3.3$ ton/cm$^2$, $\beta Ta=11.8$ ton) | | | | | |
| Allowable tensile force | Fittings according to the invention | | T-shaped members in the prior art | | |
| Ta (ton) | k | t(mm) | Sectional area A (cm$^2$) | t(mm) | Sectional area A(cm$^2$) |
| 17.4 | 2 | 11 | 13.75 | 36 | 34.2 |
| 20.1 | 3 | 9 | 13.95 | 43 | 40.9 |
| 21.4 | 4 | 7 | 12.95 | 45 | 42.8 |
| 22.1 | 5 | 6 | 12.90 | 46 | 43.7 |

The reference in the Table correspond to those in FIG. 17. The value $k$ becomes larger, the allowable force $Ta$ becomes larger although the sectional area successively decreases in the fittings according to the invention. In the Table the thickness and the sectional area of the T-shaped member are shown. It can be seen from the Table that the fittings accordings to the invention can achieve the same result with remarkably small amount of steel in comparison with the T-shaped members in the prior art.

The effects of the fittings according to the invention distinguishable over those of the prior art are as follows.

(1) According to the invention, the web of the beam is not directly jointed to the column as shown in FIGS. 7-11, so that any protrusions on the column are not required in manufacturing it in a factory, permitting easy transportation of the columns.

(2) The fittings according to the invention are fixed to the flanges of the column other than those having a box or cylindrical section to form a kind of rigid zones consisting of the flanges and the fittings, which rigid zone causes the tensile or compressive force transmitted from the flange of the beam to distribute relatively uniformly on the column, so that any horizontal stiffeners are not needed in many cases.

Therefore, the fittings according to the invention applied to connections between columns and beams of a combination structure make it easy to fill concrete thereinto and need not any working other than drilling in the factory so that a period for manufacturing the columns is shortened to reduce its cost of manufacture. Furthermore, when the column has a H-shaped section as shown in FIGS. 14 and 15, a height of the web of a beam to be connected to the flange of the column can be freely selected and the manufacture of the beams to be connected to the web of the column can be simplified by the use of the fittings according to the invention.

(3) The beveling $3a$ can be provided in the fitting for butt welding to a beam as shown in FIG. $3a$, so that the beam cut by saw or gas cutting need not any further machining. Accordingly the manufacture of the beam becomes easy and simplified.

(4) The fittings according to the invention need only 40% of steel material used in the T-shaped member and achieve an increase of the joint efficiency by more than 50%.

(5) The base plate of the T-shaped member in the prior art which is a rolled steel plate is subjected to a tensile force in a direction of its thickness, so that if the plate has an anisotropy, it affects often the yield strength of the T-shaped member. According to the invention the fittings may be made of cast steel to solve the problem as to the anisotropy. In the case of a combination of rolling and welding or extruding and welding, a suitable selection of rolling or extruding method makes it to reduce an anisotropy in triangular thick corners at the bottom of the protrusion thereby eliminating any problem on the yield strength.

(6) The fittings according to the invention are formed integrally with the holes and seats for the high strength bolts, so that nuts or heads of the bolts snugly contact the seates which serve to reinforce the proximities of the holes weakend due to them.

(7) A roughness of the surface of the base plate of the fitting according to the invention adapted to be in contact with the column can be selected within a wide range when being cast in order to increase the frictional resistance. When the fittings are made by rolling, the surface of a roll in contact with the base plate of the fittings is so formed as to make rough the surface of the base plate.

(8) The configuration of the fitting can be determined depending upon a required tensile force acting thereupon. Accordingly, shapes or forms of the base plates, protrusions and seats for bolts are constant which are favorable for mass-production.

(9) If the width of the flange of the beam is less than that of the fitting according to the invention, the supplementary fittings 11 are used for transmitting the stress of the beam as shown in FIG. 13. If the shearing stress acting on the beam is relatively large, the protrusion 4 to be welded to the web of the beam is elongated to increase the capacity for supporting the shearing force. In this manner, the shape of the fittings according to the invention can be freely selected to provide a wide extent of its application.

(10) The fittings according to the invention provide clearances between the flange of the column and the web of the beam as shown in the drawings, which clearances render it easy to provide hoop reinforcement for the column.

(11) According to the invention, the fittings are welded to the beam with the protrusions in opposition to the flange and web of the beam to minimize a strain in the base plates of the fittings caused in welding. Accordingly, the fittings can be brought into intimate contact with the column with ease.

What we claim is:

1. Fittings for connecting columns and beams of a steel frame construction comprising a rectangular base plate to be connected to said column, said base plate having:
    (a) a first face for mating with a column, said first face designed to conform to the contours of said column in the area of said mating;
    (b) a second face directed towards a beam including a raised portion tapering outwardly, downwardly from an essentially horizontally central apex and a flat edge portion parallel thereto;
    (c) a horizontal protrusion in opposition to a flange of said beam and projecting from said raised portion;

(d) a vertical protrusion in opposition to a web of said beam and projecting from said base plate to form a T-shaped protrusion with said horizontal protrusion; and (e) seats formed on said base plates having holes for receiving bolts and formed with their longitudinal axes in the direction parallel to the horizontal protrusion.

2. The fittings of claim 1 further comprising two fittings of identical configuration welded as upper and lower fittings to one end of said beam, the vertical protrusion of said lower fitting upwardly extending in opposition to the web of said beam.

3. Fittings for connecting columns and beams of a steel frame construction comprising a rectangular base plate to be connected to said column, said base plate having:

(a) a first face for mating with said column, said first face designed to conform to the contours of said column in the area of said mating;

(b) a second face directed toward said beam including a raised portion tapering outwardly, downwardly from an essentially horizontally central apex and a flat edge portion parallel thereto;

(c) a horizontal protrusion in opposition to a flange of said beam and projecting from said raised portion;

(d) a vertical protrusion in opposition to a web of said beam and projecting from said base plate to form a T-shaped protrusion with said horizontal protrusion, said vertical protrusion being elongated to form the longer surface of the protrusions in opposition to the web of said beam; and (e) seats formed on said base plate having holes for receiving bolts.

* * * * *